United States Patent [19]
Yaple

[11] Patent Number: 5,118,126
[45] Date of Patent: Jun. 2, 1992

[54] POWERED MOTORCYCLE LIFT/STAND

[76] Inventor: Winfred E. Yaple, 6428 Pepperdine, NE., Albuquerque, N. Mex. 87111

[21] Appl. No.: 567,256

[22] Filed: Aug. 13, 1990

[51] Int. Cl.$^5$ .............................................. B62H 1/06
[52] U.S. Cl. ................................... 280/293; 280/298; 280/755; 180/219; 254/423
[58] Field of Search ............... 280/293, 298, 301, 304, 280/755; 180/219; 254/423

[56] References Cited

U.S. PATENT DOCUMENTS

| | | |
|---|---|---|
| 1,039,838 | 10/1912 | Steinberger . |
| 4,133,402 | 1/1979 | Soo Hoo .............................. 280/293 |
| 4,223,906 | 9/1980 | Gratza ................................. 280/301 |
| 4,432,562 | 2/1984 | Cline ................................... 280/300 |
| 4,513,837 | 4/1985 | Archer ................................ 180/209 |
| 4,580,804 | 4/1986 | Weber ................................. 280/300 |
| 4,582,336 | 4/1986 | Onoda ................................ 280/293 |
| 4,660,847 | 4/1987 | Yagasaki ............................ 280/298 |
| 4,693,488 | 9/1987 | Bernocco .......................... 280/293 |
| 5,021,037 | 6/1991 | Tervola ............................. 180/6.2 X |
| 5,040,812 | 8/1991 | Patin ................................. 280/772 X |

FOREIGN PATENT DOCUMENTS

| | | | |
|---|---|---|---|
| 242203 | 1/1987 | Fed. Rep. of Germany ...... | 280/293 |
| 756515 | 9/1933 | France ................................ | 280/301 |
| 262272 | 10/1989 | Japan ................................. | 280/293 |
| 3585 | 1/1990 | Japan ................................. | 280/293 |
| 122719 | 10/1927 | Sweden .............................. | 280/293 |

*Primary Examiner*—Charles A. Marmor
*Assistant Examiner*—Kevin Hurley
*Attorney, Agent, or Firm*—Donovan F. Duggan; Deborah A. Peacock

[57] ABSTRACT

A hydraulically, pneumatically, electrically, or engine operated motorcycle center stand assembly having a ground-contacting lower stand unit rotatable about an axis on an upper stand unit. Parking is accomplished by rotation of said lower stand into said ground-contacting position, followed by downward pivoting of said upper stand unit, thereby raising said rear end of said motorcycle. The stand is raised by reversing the sequence. Ground contacting area, stand width, and stability are increased while simultaneously retaining maximum road clearance.

20 Claims, 6 Drawing Sheets

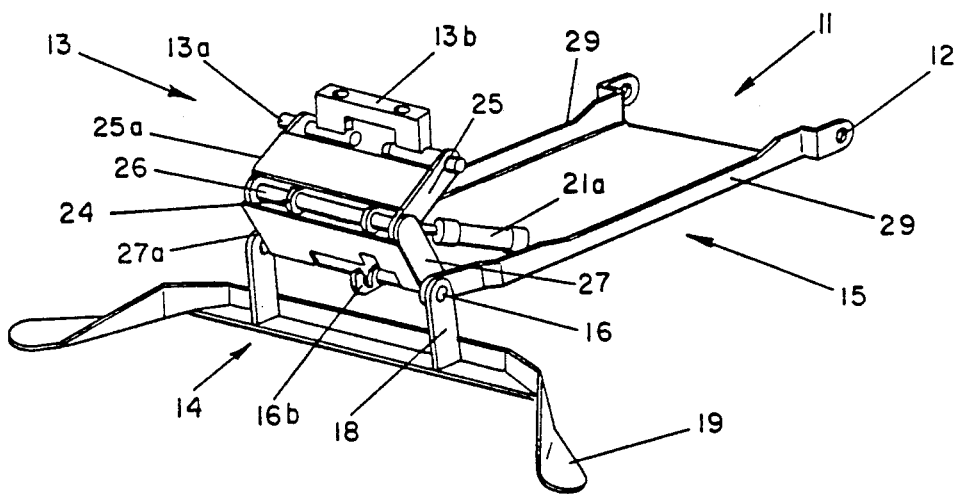
FIG — 5
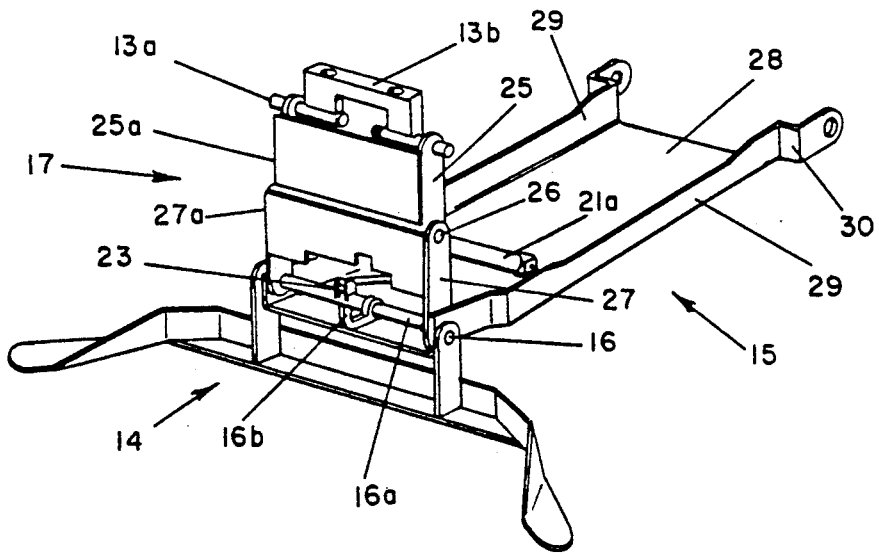
FIG — 6

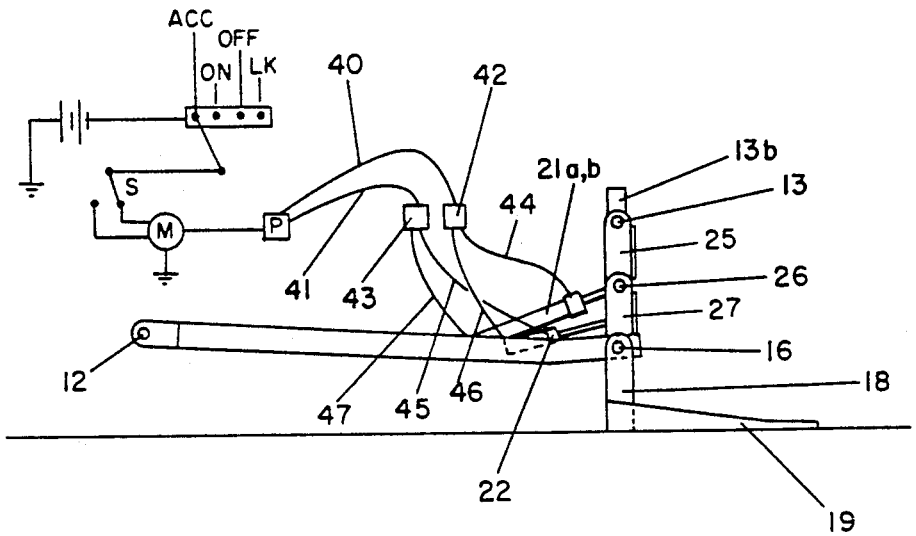
FIG—8
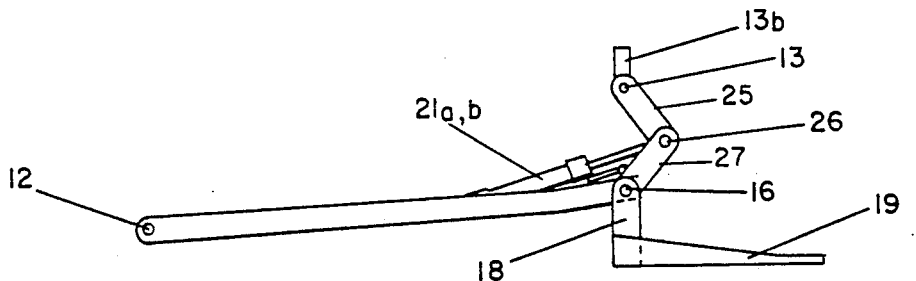
FIG—9
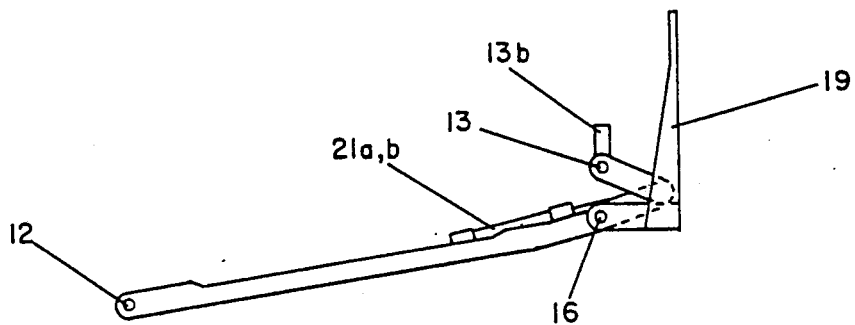
FIG—10

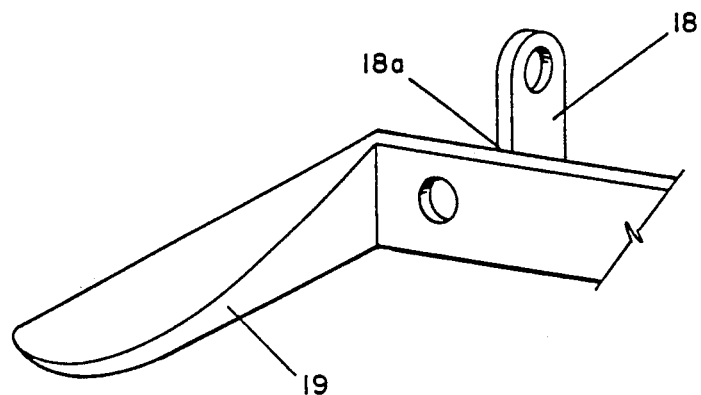
FIG—11
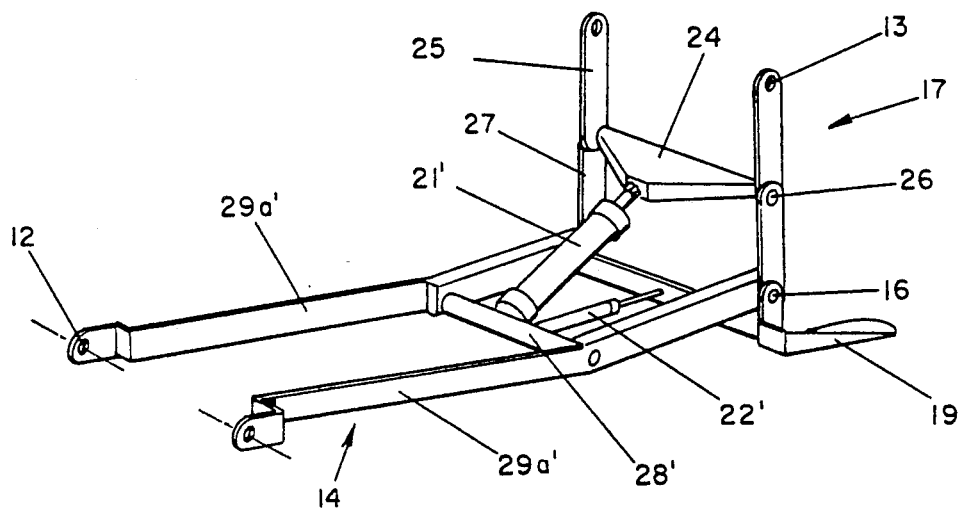
FIG—12
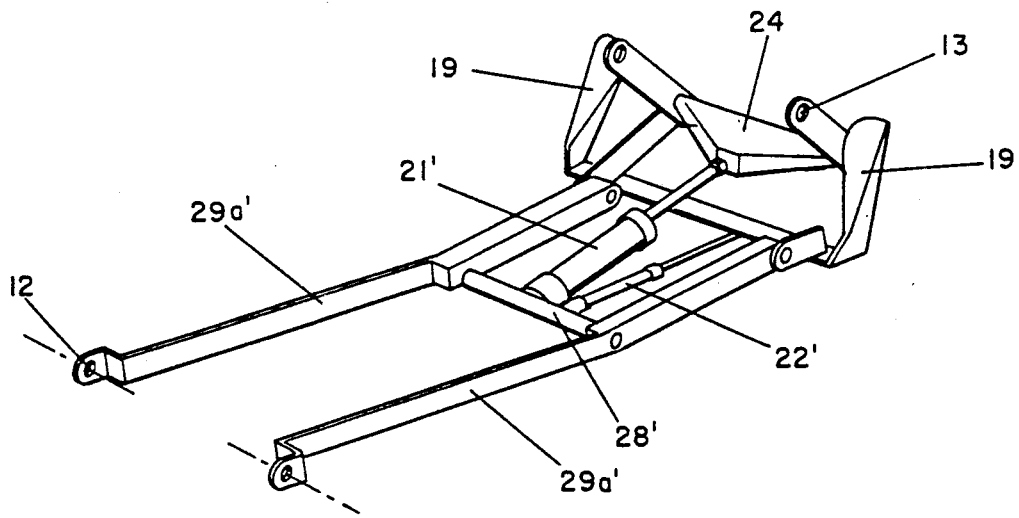
FIG—13

POWERED MOTORCYCLE LIFT/STAND

BACKGROUND OF THE INVENTION

1. Field of the Invention (Technical Field)

The present invention relates to an automatically extendable and retractable center stand for motorcycles and a method for using such stand.

2. Description of the Related Art Including Information Disclosed under 37 C.F.R. §§1.97-1.99 (Background Art)

Stands for motorcycles are essential in parking the motorcycles. The well known side-mounted "kick" stand, although expedient and easy to operate, presents only one-point surface contact. On ground surfaces comprising soft sand, hot asphalt, oil slicks, or the like, the likelihood of upsetting the motorcycle is great.

Center stands for motorcycles offer an alternative parking mechanism to motorcycle riders. However, although the center stand offers a more stable two-point surface contact, it can be cumbersome and difficult to operate. The center stand must be pressed against the ground surface by overcoming an upwardly-exerted spring force (usually by standing on it), while the motorcycle is rocked backwardly, using the stand as a fulcrum. This involves strength and agility not possessed by all riders. Also the rider must dismount the motorcycle in order to engage the center stand. In view of the fact that many of today's fully equipped touring motorcycles weigh upwards of 800 pounds, many riders will opt to use the easily engaged, less stable side stand. Concomitantly, the more stable center stand is used only rarely, if at all.

Center stands are disclosed in the following references. Steinberger U.S. Pat. No. 1,039,838, entitled, "Motor Cycle Stand," discloses a rear wheel mounted center stand, apparently manually extended, which is retracted and locked into the traveling position by forward motion of the motorcycle.

Cline U.S. Pat. No. 4,432,562, entitled, "Motorcycle Jack Stand" and Weber U.S. Pat. No. 4,580,804, entitled, "Jack Stand for Motorcycles" apparently both teach motorcycle center stand structures wherein the legs of the stand are manually (or pedally) pivoted downwardly and then telescopically extended.

Bernocco U.S. Pat. No. 4,693,488, entitled, "Electrically Controlled Motorcycle Stand" discloses a center stand structure rotatable downwardly into the operative position by an electric motor and gear assembly.

Archer U.S. Pat. No. 4,513,837 entitled, "Motorcycle with Outrigger Wheels" discloses hydraulically or pneumatically actuated outrigger wheels to provide lateral support.

Yagasaki U.S. Pat. No. 4,660,847, entitled, "Main Stand Device for Two-Wheeled Motorcycle" teaches a center stand structure manually rotatable downwardly having a motor-driven telescoping leg.

SUMMARY OF THE INVENTION

(Disclosure of the Invention)

The present invention relates to an automated center stand for motorcycles. The preferred embodiment of the invention comprises a motorcycle stand comprising an upper stand unit having first and second ends. The first end is pivotally affixable to the frame of a motorcycle. A lower stand unit is pivotally affixed to the upper stand unit and spaced away from the first end. The lower stand unit is rotatable between a retracted position and a ground contactable position. The lower stand unit comprises ground engaging feet.

Actuators are provided for rotating the lower stand unit between the retracted and the ground contactable positions and for lowering and raising the lower stand unit. The ground engaging feet are thereby moved toward and away from the ground by pivoting the upper stand unit about its first end, thereby moving the attached lower stand unit towards and away from the ground.

The preferred embodiment further comprises a first actuator for rotating the lower stand unit between retracted and ground contactable positions, and a second actuator for lowering and raising the lower stand unit by pivoting the upper stand unit about its first end.

In the preferred embodiment, there is provided an automated center stand assembly for a motorcycle having a main frame or chassis comprising a lower stand unit rotatable about an axis on an upper stand unit, the upper stand unit being pivotable about an axis on the main frame. First actuator means are provided for rotating the lower stand unit into ground surface contactable and retracted positions, and second actuator means for pivoting the upper stand unit into lowered and raised positions. In the preferred embodiment, the actuator means are hydraulic actuators; in alternative embodiments, the actuators are pneumatic actuators or electric motors, including rotary motors with motion conversion means and linear motors. Additionally, the actuator means may comprise linkage means connected to engine power take-off means. Additionally, the first actuator means may be by pedal action provided by the rider of the motorcycle.

In the preferred embodiment, the first actuator means rotates the lower stand unit about an axis rearwardly located on the upper stand unit. In the preferred embodiment, the second actuator means actuates linkage means rearwardly located on the upper stand unit.

In an alternative embodiment, the first actuator means rotates the lower stand unit about an axis centrally located on the upper stand unit. Alternatively, the linkage means may be centrally located on the upper stand unit.

In the preferred embodiment, there is provided a motorcycle having a main frame with a first axis thereon. Second actuator means are provided for pivoting an upper stand unit about the first axis. The upper stand unit is provided, with a second axis thereon, and first actuator means are provided for rotating a lower stand unit about the second axis. In the preferred embodiment, the actuator means are hydraulic; alternatively, they may be pneumatic, comprise electric motors, or derive power from mechanical linkages from the motorcycle engine. The preferred embodiment should be with both actuators positioned between the axes. The alternative embodiment is with both actuators positioned rearwardly relative to the axes.

In the preferred embodiment, an automated center stand assembly for a motorcycle comprises a main frame having first and third axes thereon, an upper stand unit comprising parallel elongate beams having crossbar means thereon, a duality of actuator means pivotally secured to the crossbar means, linkage means comprising arms and a second axis between the arms, the arms of the linkage means being pivotally secured to the third axis, and a fourth axis on the upper stand unit. A lower stand unit having detachable foot pads thereon is rotatable about the fourth axis. Actuation of one of the actuator means translates the second axis, thereby pivoting the upper stand unit about.

To lower and raise the automated center stand assembly of the invention, the lower stand unit is rotated about an axis on the upper stand unit by actuating a first actuator, and the upper stand unit is pivoted about an axis on the main frame by actuating a second actuator.

A primary object of the invention is to provide an automated motorcycle center stand which is safe and reliable in operation.

A further object of the invention is to provide simple and effective mechanisms for lowering and raising the center stand.

Yet another object of the invention is to provide alternative mounting and storage expedients of center stand components consistent with space, configuration and performance requirements, including road clearance.

Yet another object of the present invention is increasing a motorcycle center stand's width, ground contact area, and stability while retaining maximum cornering clearance.

One advantage of the present invention is the provision of an automated motorcycle stand which does not require rider strength or agility in operation.

Another advantage of the present invention is the provision of an automated motorcycle center stand which is pleasing in appearance and conformation.

Still another advantage of the present invention is the capability of lowering or raising the center stand while rider and passenger remain mounted.

A final advantage of the present invention is the provision of an automated center stand which cannot be retracted without the ignition key, thereby deterring motorcycle theft.

Other objects, advantages and novel features, and further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

FIG. 4 is a perspective view of the preferred embodiment in the fully retracted position;

FIG. 5 is a perspective view of the preferred embodiment in an intermediate position;

FIG. 6 is a perspective view of the preferred embodiment in the parked position;

FIG. 8 is a side view of the preferred embodiment in a fully retracted position, together with a simplified electric and hydraulic schematic;

FIG. 9 is a side view of the preferred embodiment in an intermediate position;

FIG. 10 is a side view of the preferred embodiment in the fully retracted or raised position;

FIG. 11 is a perspective view of the footpad of the preferred embodiment;

FIG. 12 is a perspective view of an alternative embodiment of the invention in an extended position;

FIG. 13 is a perspective view of the FIG. 12 alternative embodiment of the invention in an intermediate position;

DETAILED DESCRIPTION OF THE PREFERRED EMBODIMENTS OF THE INVENTION (BEST MODES FOR CARRYING OUT THE INVENTION)

Figure 1:
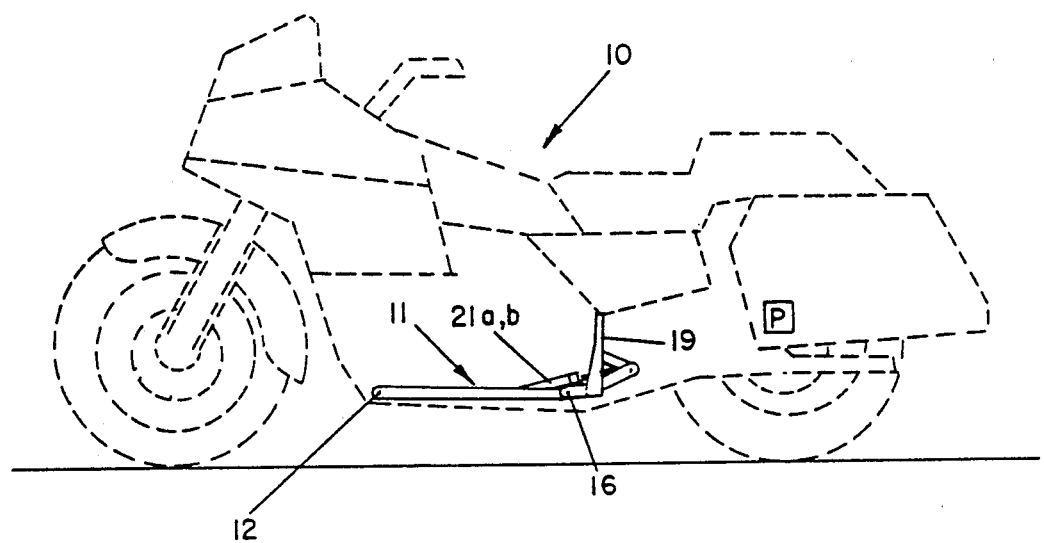
FIG. 1 is a side view of a preferred embodiment of the invention in the fully retracted or travelling position.

Reference is now made to FIGS. 1.-10 of the drawings which show a preferred embodiment of an automated motorcycle center stand in accordance with the invention. As seen therein, disposed on a motorcycle 10 is a center stand assembly 11 pivotally secured to the main frame or chassis of the motorcycle. Center stand assembly 11 comprises lower stand unit 14 and upper stand unit 15. Upper stand unit 15 supports lower stand unit 14, actuators 21a, 21b, and actuator 22, and linkage 17. In turn, upper stand unit 15 is supported by the motorcycle frame or chassis at axes 12 and 13. In the preferred embodiment, axis 13 comprises stub shafts 13a; additional support is provided by reinforcing beam 13b. Lower stand unit 14 comprises legs 18 and ground-contacting foot pads 19.

Lower stand unit 14 is rotatably mounted with respect to axis 16 of upper stand unit 15. Lower stand unit 14 is rotatable about axis 16 by actuator 22; in the preferred embodiment, axis 16 comprises shaft 16a, which rotates in upper stand unit 15 together with lower stand unit 14.

In the preferred embodiment of the invention, actuator 22 is a hydraulic actuator; actuator 22, however, may also be pneumatic or comprise an electric motor or a mechanical linkage powered directly by the motorcycle engine or transmission.

Figure 2:
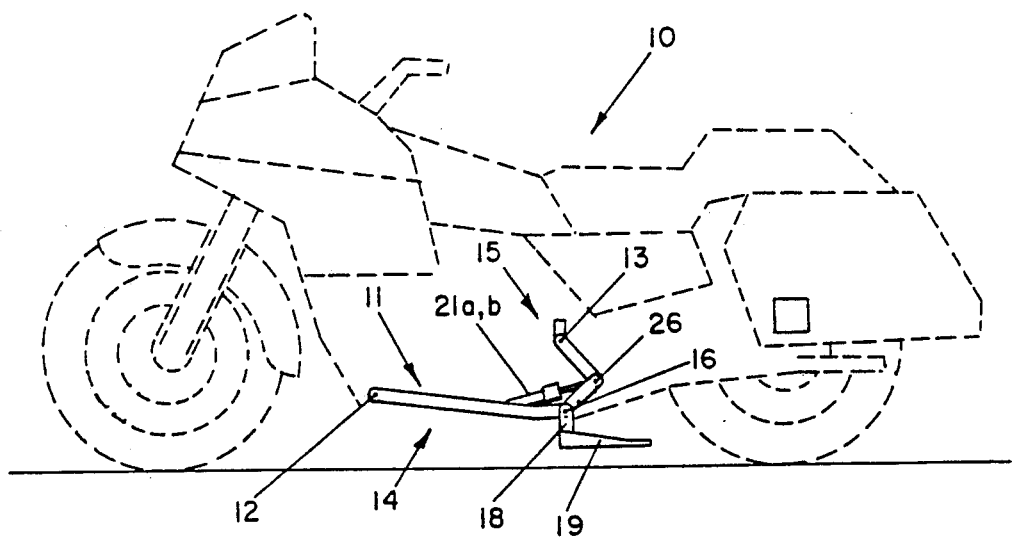
FIG. 2 is a side view of the FIG. 1 embodiment in an intermediate position.
Figure 3:
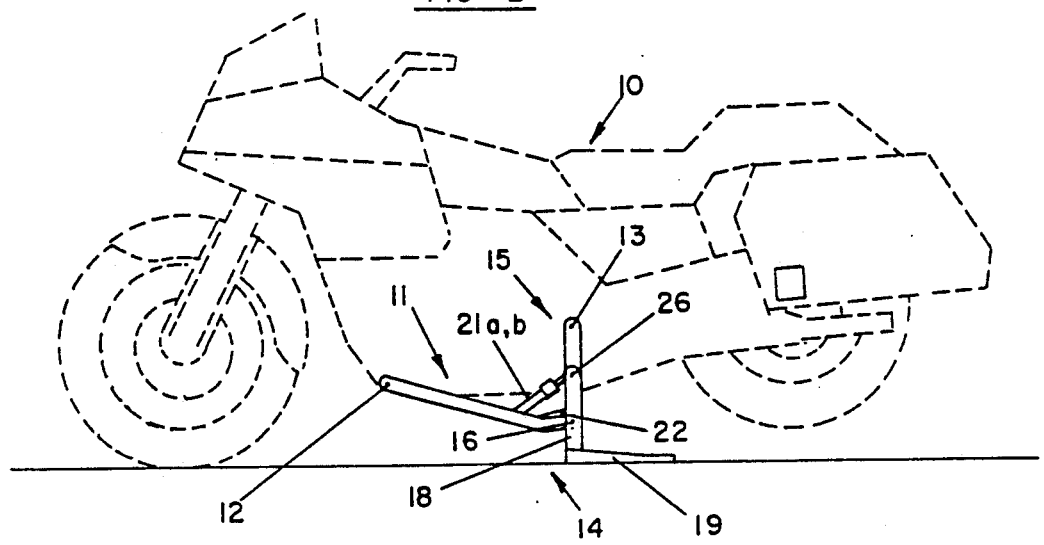
FIG. 3 is a side view of the FIG. 1 embodiment in the fully extended or parking position.
Figure 7:
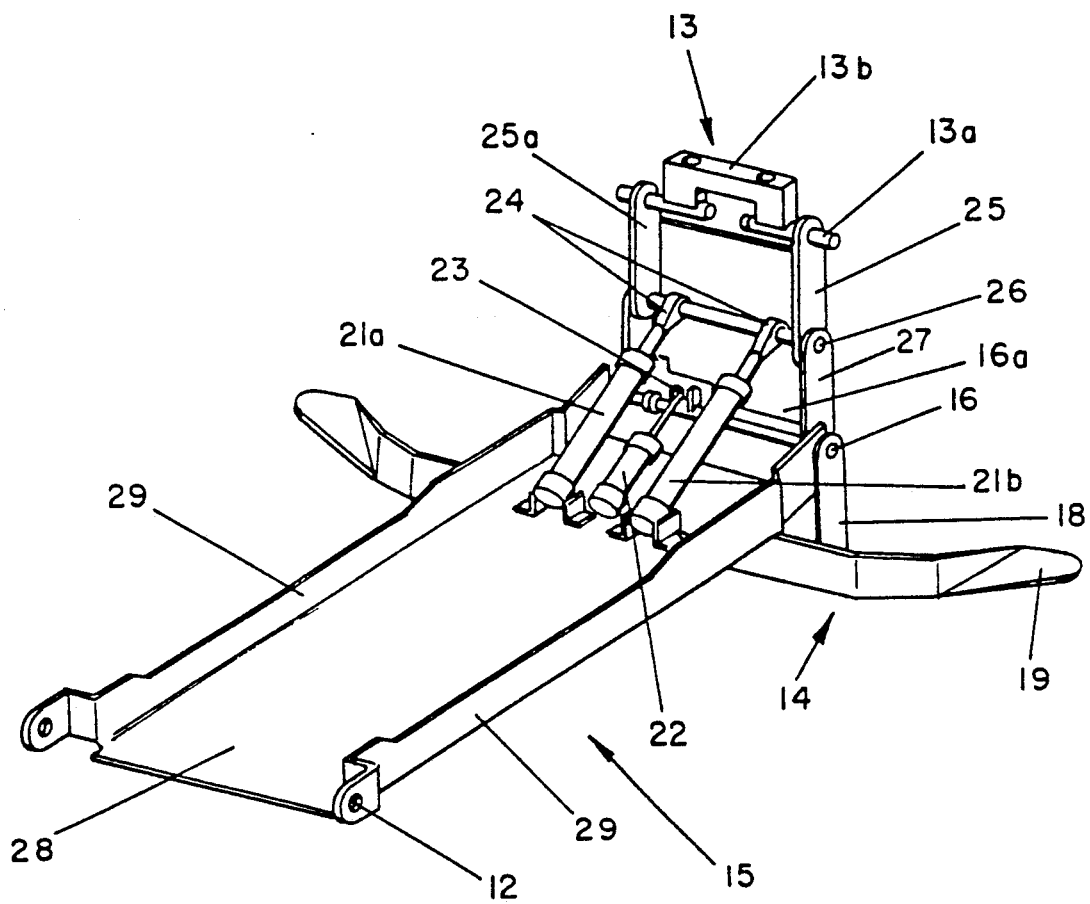
FIG. 7 is a perspective view of the preferred embodiment showing actuator positions in the extended or parked position.

In the preferred embodiment, the piston of actuator 22 is rotationally secured to shaft 16a by crank connection 23, as shown in FIGS. 6 and 7. Shaft 16a also mounts hook 16b which engages stub shaft 13a upon full rotation of lower unit 14 into the retracted position. This provides an additional safety factor in assuring that lower stand unit 14 remains in the retracted state while travelling. Full outward excursion or extension of the piston of actuator 22 results in rotation of shaft 16a and lower stand unit 14 about axis 16, disengagement of hook 16b vertical deployment of legs 18, and horizontal positioning of foot pads 19 above the ground surface. This position is the ground surface contactable position of lower stand unit 14, as seen in FIGS. 2 and 5. Conversely, full inward excursion or retraction of the piston of actuator 22 results in oppositely-directed rotation of shaft 16a and lower stand unit 14 about axis 16. This is the retracted position of lower stand unit 14, as seen in FIGS. 1 and 4.

In the preferred embodiment, upper stand unit 15 of center stand assembly 11 comprises base portion 28 having upstanding edge portions 29. Base portion 28, in addition to providing pivotal support for actuators 21a, 21b, and 22, provides a fairing surface. Such surface not only enhances the undercarriage appearance of the motorcycle, but also contains oil and hydraulic fluid leakage, as well as deflecting road debris.

Upstanding edge portions 29 are angled outwardly at 30 and pivotally joined to axis 12 located forwardly on the motorcycle main frame or chassis.

In the preferred embodiment, linkage 17, comprising arms 25 and 27, reinforcing members 25a and 27a, and axis 26, is rearwardly positioned and pivotally connected to axes 13 and 16. Reinforcing members 25a and 27a provide additional strength and rigidity to arms 25 and 27, and hence to linkage 17.

In the preferred embodiment, the pistons of actuators 21a and 21b are operatively connected to linkage 17 at axis 26 by bearing couplers 24. Again, in the preferred embodiment, actuators 21 are hydraulically actuated; actuators 21, however, may be pneumatic or may comprise an electric motor or a mechanical linkage connected to the engine or transmission. In the preferred embodiment, full inward retraction of the piston of actuators 21 translates axis 26 of linkage means 17 towards actuators 21. This action pivots and linearly extends arms 25 about frame axis 12. Upper stand unit 15 thereby lowers lower stand unit 14 into actual ground surface contact; continued actuation of actuator 21 effectively raises the rear end of the motorcycle off the ground.

Conversely, full outward extension of actuators 21a and 21b translates axis 26 of linkage means 17 away from actuator 21. This action pivots and "jackknifes" arms 25 and 27 of linkage 17, in turn pivoting upper stand unit 15 upwardly about frame axis 12. Upper stand unit 15 thereby raises lower stand unit 14 from ground surface contact, and also effectively lowers the rear end of the motorcycle into ground contact.

The various disclosed axes of the preferred embodiment may comprise various mechanical elements. For example, axes 12 and 13 on the motorcycle main frame may comprise threaded stub shafts with nuts attached. Axes 12, 13, 16 and 26 may also comprise stationary or rotatable shafts mounting bearings, spring-loaded bars, or the like. Hinge joints may also be employed. In each case, the particular mechanical element employed will be a function of applicable strength and space requirements. In short, the various axes may comprise any appropriate prior art device permitting relative rotation between members about such axes.

In the preferred embodiment, a hydraulic system is provided to operate actuators 21a, 21b and 22. A hydraulic pump, reservoir and a reversible DC motor are positioned in a luggage bag, under the seat, or in any other convenient location affording space. With specific reference to FIGS. 8-10, assuming the center stand assembly is in the extended or parked position, the ignition switch is positioned in the "park" or "accessories" position. Thereafter, the center stand switch S is placed in the "up" position. Motor M rotates hydraulic pump P in a direction such that pressurized hydraulic fluid flows along conduit 41 to flow diverter 43. Flow diverter 43, employing a plurality of check valves, initially supplies pressurized hydraulic fluid along conduit 47 to the rear of actuators 21a and 21b, hydraulically connected in parallel, thereby extending their pistons. The pistons of actuators 21 translate axis 26 of linkage 17 away from actuator 21, thereby "jackknifing" linkage 17 and pivoting upper stand unit 15 upwardly about frame axis 12. This action, in turn, raises lower stand unit 14 out of ground surface contact, and lowers the rear end of the motorcycle.

Upon full extension of the pistons of actuators 21, back pressure in conduit 47 results in flow diverter 43 diverting pressurized hydraulic fluid to conduit 45. Conduit 45 supplies pressurized hydraulic fluid to the forward end of actuator 22, retracting its piston and rotating shaft 16a and lower stand unit 14 about axis 16 into the retracted position. Center stand assembly 11 is now in the retracted or travelling position.

In order to extend the center stand assembly 11 to the extended or parked position, a reverse sequence is followed. Center stand switch S is positioned in the "down" position. This reverses the field or armature current to motor M, thereby reversing motor M. Motor M rotates hydraulic pump P in an opposite direction such that pressurized hydraulic fluid flows along conduit 40 to flow diverter 42. Flow diverter 42, also employing a plurality of check valves, initially supplies pressured hydraulic fluid along conduit 46 to the rear of actuator 22. The piston of actuator 22 is extended, thereby rotating shaft 16a and lower stand unit 14 about axis 16 into the ground contactable position. Upon full outward extension of the piston of actuator 22, back pressure in conduit 46 results in flow diverter 42 diverting pressurized hydraulic fluid to conduit 44. This fluid flows to the forward end of actuators 21a and 21b, retracting the pistons of actuator 21a and 21b, translating axis 26 of linkage 17 towards actuator 21, extending linkage 17, and thereby pivoting upper stand unit 15 downwardly about chassis or frame axis 12. This action, in turn, lowers lower stand unit 14 into actual ground surface contact and ultimately raises the rear end of the motorcycle off the ground. Center stand assembly 11 is now in the extended or parked position. Alternatively, the rear tire of the motorcycle may be kept on the ground when the center stand assembly 11 is in an intermediate extended position to provide a four-point ground contact (two tires and two feet of stand).

Whether in the parked, travelling, or some intermediate position, terminating power to motor M, such as turning switch S "off" or turning the ignition switch to a position other than "park" or "accessories," will provide a hydraulic lock. Although pumping ceases, stand assembly 11 will remain in the selected position due to residual hydraulic pressure. Additionally, microswitches are provided to assure cessation of current to motor M upon detecting full retraction or extension of the pistons of actuators 21.

In the preferred embodiment, motor M is a reversible electric motor. Alternatively, power could be provided by direct connection to the motorcycle engine or transmission.

With specific reference to FIG. 11, a footpad 19 of the preferred embodiment of the invention is therein depicted To allow interchangeability, footpads 19 are preferably detachably secured to legs 18 as at 18a. Attachment may be by bolting, spot-welding, clamping, or like means well known in the art. Such detachable connection permits free interchange of footpads of different configuration, necessitated by the frame and exhaust configurations of various motorcycle models, road and terrain factors, or aesthetics and design considerations. In all cases, however, footpads 19 are required to have a predetermined contact area to provide adequate support for the motorcycle in the parked position.

The footpads 19 of the preferred embodiment provide four or more times the surface contact area of conventional motorcycle footpads. Assuming 2-3 square inches of contact area conventionally, footpads 19 would accordingly provide up to 20 square inches of contact, greatly increasing stability.

In the preferred embodiment, footpads 19 are connected by a crossbar, providing additional contact area between the footpads, thus further increasing stability. Additionally, the increased dimensions of footpads 19 include increased height; this permits the application of printed matter, engraving, decals or the like on the outermost portion of footpads 19.

In the preferred embodiment of the invention, the width of the center stand is two to four times the width of conventional motorcycle center stands. Considering a conventional width of 9-10 inches, this would provide a width of 20-40 inches, again greatly increasing stability.

With specific reference to FIGS. 12 and 13, an alternative embodiment of the invention is therein depicted. Base portion 28 and upstanding edge portions 29 have been replaced by beams 29a' and crossbar 28'. Actuators 21 now comprise single actuator 21'; actuators 21' and 22' are pivotally secured to crossbar 28'.

This alternative embodiment presents a lighter, more compact version of the preferred embodiment of the invention, suitable for smaller, lighter motorcycles.

Operation of this embodiment is similar to that of the preferred embodiment with the exception that the hydraulic connections to actuator 22' are reversed: extension of the piston of actuator 22' operates to rotate lower stand unit 14 into the retracted position, while retraction of the piston of actuator 22' rotates lower stand unit 14 into the ground contactable position.

Figure 14:
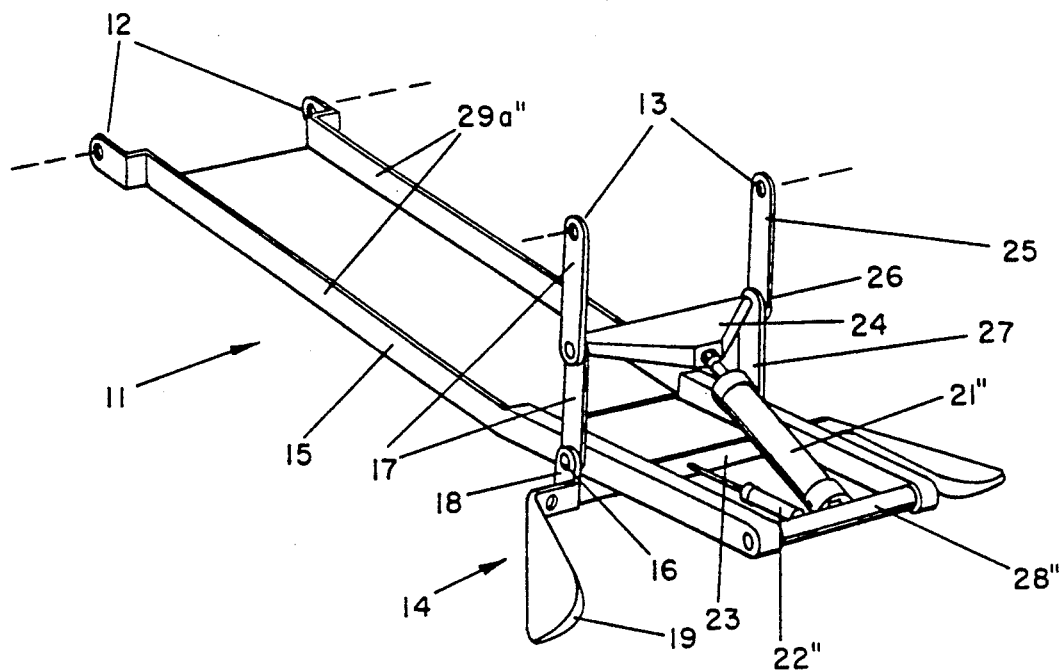
FIG. 14 is a perspective view of another alternative embodiment of the invention in an extended position.
Figure 15:
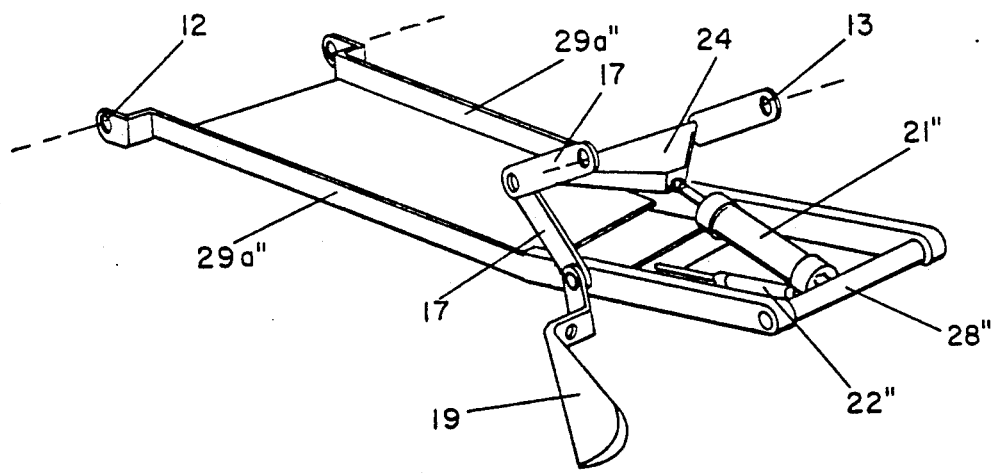
FIG. 15 is a perspective view of the FIG. 14 alternative embodiment of the invention in an intermediate position.
Figure 16:
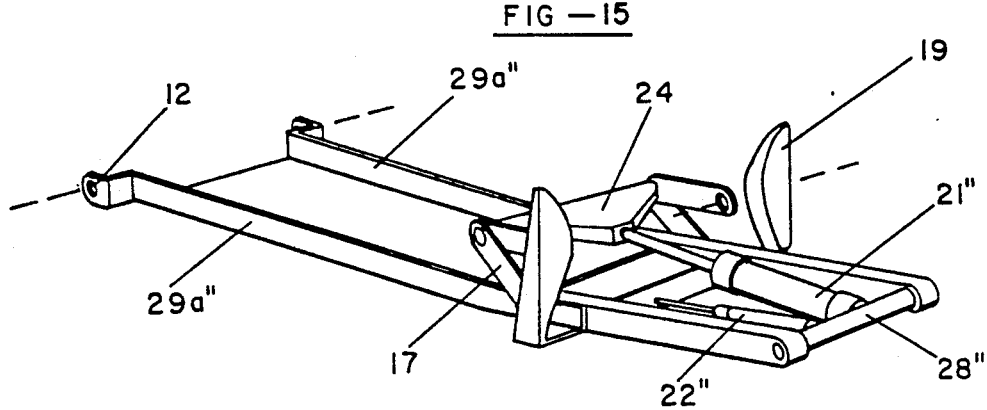
FIG. 16 is a perspective view of the FIG. 14 alternative embodiment of the invention in the raised position.

With specific reference to FIGS. 14, 15, and 16, another alternative embodiment of the invention is therein depicted. In this embodiment, the relative locations of linkage 17 and crossbar 28 have been reversed. This results in both actuators 21" and 22" being rearwardly positioned. Axis 16 and linkage 17 are centrally located relative to the actuators 21 and 22.

Operation of this alternative embodiment is similar to that of the preferred embodiment. The hydraulic connections to actuator 22" are such that retraction of the piston of actuator 22" is effective to rotate lower stand unit 14 to the retracted position, while extension of the piston of actuator 22" rotate lower stand unit 14 to the ground contactable position.

An alternative embodiment of the invention uses a pneumatic system rather than a hydraulic system. Although similar in principle to a hydraulic system, and thus not shown in the drawings, a pneumatic system would necessarily involve higher pressures due to compression. Greater safeguards, such as airtight seals would have to be employed to counteract leakage of pressurized gas.

Another alternative embodiment of the invention utilizes electric motors, also not shown. If linear motors are used, this system requires limit switches or other position detecting mechanisms, to signal slider (armature) position so current can be diverted to the other linear electric motor. If rotary motors are employed, motion conversion means must also be used, such as ball screw actuators, gears, cams, or the like.

Yet another alternative embodiment of the invention utilizes power derived from the motorcycle engine itself. Mechanical linkages from moving parts of the motorcycle engine or transmission shaft transfer motion to the center stand. This motion is then converted by ball screw actuators, gears, cams, or the like. Alternatively, this motion may directly drive a hydraulic or pneumatic pump. Operation is otherwise similar to that of the preferred embodiment.

An alternative electric system permits electric motor energization while the motorcycle transmission is in the "neutral" (green light) position. Safety interlocks are provided to disable the circuit if the motorcycle gears are engaged. This alternative, of course, conserves battery charge by using alternator output.

An alternative (and simpler) overall system, also not shown, involves the elimination of actuators 22 entirely. Rotating force for lower stand unit 14 is manually (or pedally) provided, while upper stand unit 15 would still require hydraulic actuation.

The center stand invention may provide an anti-theft feature in requiring a key to power the stand.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. A motorcycle stand comprising;
   an upper stand unit having first and second ends, said first and thereof adapted to be pivotally attached to an axis on a frame of a motorcycle;
   a lower stand unit pivotally affixed to said upper stand unit and spaced away from said first end thereof, said lower stand unit being rotatable thereabout between a retracted position and a ground contactable position, said lower stand unit comprising ground engaging foot means;
   actuator means for rotating said lower stand unit between said retracted and said ground contactable positions and for lowering and raising said lower stand unit and thereby said ground engaging foot means toward and away from the ground, when the stand is mounted on a motorcycle frame, by pivoting said upper stand unit about said first end, thereby moving said lower stand unit, which is attached to said upper stand unit, towards and away from the ground under a motorcycle; wherein
   said lower stand rotating and lowering and raising actuator means comprises first actuator means for rotating said lower stand unit between said retracted and ground contactable positions and second actuator means for lowering and raising said lower stand unit by pivoting said upper stand unit about said first end where it is pivotally attached to the motorcycle frame.

2. The invention of claim 1 wherein at least one of said actuator means comprises hydraulic actuators.

3. The invention of claim 1 wherein at least one of said actuator means comprises pneumatic actuators.

4. The invention of claim 1 wherein at least one of said actuator means comprises electric motors.

5. The invention of claim 4 wherein at least one of said electric motors comprises linear electric motors.

6. The invention of claim 4 wherein at least one of said electric motors comprises a rotary electric motor having motion conversion means.

7. The invention of claim 1 wherein said first actuator means rotates said lower stand unit about an axis located on said upper stand unit generally centrally disposed between said first and second ends thereof.

8. The invention of claim 1 wherein said first actuator means rotates said lower stand unit about an axis located on said upper stand unit generally rearwardly disposed between said first and second ends thereof.

9. The invention of claim 1 wherein said first actuator means rotates said lower stand unit about an axis in the vicinity of said second end of said upper stand unit.

10. The invention of claim 1 wherein said second actuator means comprises linkage means for moving said upper stand unit between raised and lowered positions.

11. The invention of claim 1 wherein said first actuator means comprises pedally actuated rotation of said lower stand unit.

12. The invention of claim 10 wherein said linkage means is centrally located on said upper stand unit relative to said second actuator means.

13. The invention of claim 10 wherein said linkage means is rearwardly located on said upper stand unit relative to said second actuator means.

14. The invention of claim 1 wherein said axis on said upper stand unit comprises shaft means having hook means thereon.

15. An automated center stand assembly for motorcycles comprising:
a main frame having first and third axes thereon;
an upper stand unit comprising a base portion means having upstanding edge portion crossbar means thereon;
a plurality of actuator means pivotally secured to said base portion means;
linkage means comprising arms and a second axis between said arms;
said arms of said linkage means being pivotally secured to said third axis and to a fourth axis on said upper stand unit; and
a lower stand unit having detachable foot pads thereon rotatable about said fourth axis;
whereby actuation of one of said actuator means translates said second axis thereby pivoting said upper stand unit about said first axis; and
whereby actuation of the other of said actuator means rotates said lower stand unit about said fourth axis.

16. The invention of claim 15 wherein the crossbar means is rearwardly located on said upper stand unit relative to said actuator means.

17. The invention of claim 15 wherein the crossbar means is centrally located on said upper stand unit relative to said actuator means.

18. A method for lowering and raising an automated center stand assembly for a motorcycle having a main frame comprising said steps of:
(a) rotating a lower stand unit about an axis on an upper stand unit; and
(b) pivoting the upper stand unit about an axis on a motorcycle main frame wherein the step of rotating a lower stand unit includes the step of actuating first actuator means; and wherein the step of pivoting the upper stand unit includes the step of actuating second actuator means.

19. The invention of claim 18 wherein the step of actuating a second actuator means includes the step of extending linkage means.

20. The invention of claim 18 wherein the step of actuating a second actuator means includes the step of retracting linkage means.

* * * * *